United States Patent [19]

Kimura et al.

[11] 4,278,975

[45] Jul. 14, 1981

[54] NAVIGATION-MONITORING APPARATUS

[75] Inventors: Yoshinori Kimura, Yokohama; Masuki Sunayama; Yoshiki Okamoto, both of Machida, all of Japan

[73] Assignee: Tokyo Shibaura Denki Kabushiki Kaisha, Kawasaki, Japan

[21] Appl. No.: 4,533

[22] Filed: Jan. 18, 1979

[30] Foreign Application Priority Data

Jan. 27, 1978 [JP] Japan ................................. 53-8104

[51] Int. Cl.³ .............................................. G01S 13/87
[52] U.S. Cl. ................................. 343/6 R; 343/5 BD
[58] Field of Search ............................ 343/5 BD, 6 R

[56] References Cited

U.S. PATENT DOCUMENTS

| | | | |
|---|---|---|---|
| 3,136,991 | 6/1964 | De Faymoreau et al. | 343/6 R X |
| 3,772,693 | 11/1973 | Allard et al. | 343/5 BD X |
| 4,063,240 | 12/1977 | Isbister et al. | 343/6 R X |

*Primary Examiner*—T. H. Tubbesing
*Attorney, Agent, or Firm*—Cushman, Darby & Cushman

[57] ABSTRACT

A navigation-monitoring apparatus comprises a fixed ground station sending forth an interrogation signal to a ship and a transponder carried on the ship and transmitting a reply signal to the fixed ground station in response to the interrogation signal. A microwave sensor carried on the ship measures the distance between the ship and the nearest bank. Data on the measured distance is added to a reply signal sent forth from the ship to the fixed ground station. The fixed ground station measures an interval between a point of time at which the interrogation signal was issued and a point of time at which a reply signal from the ship was received, thereby defining the position of the ship from said time interval and data on the ship-to-bank distance.

5 Claims, 5 Drawing Figures

FIG. 2
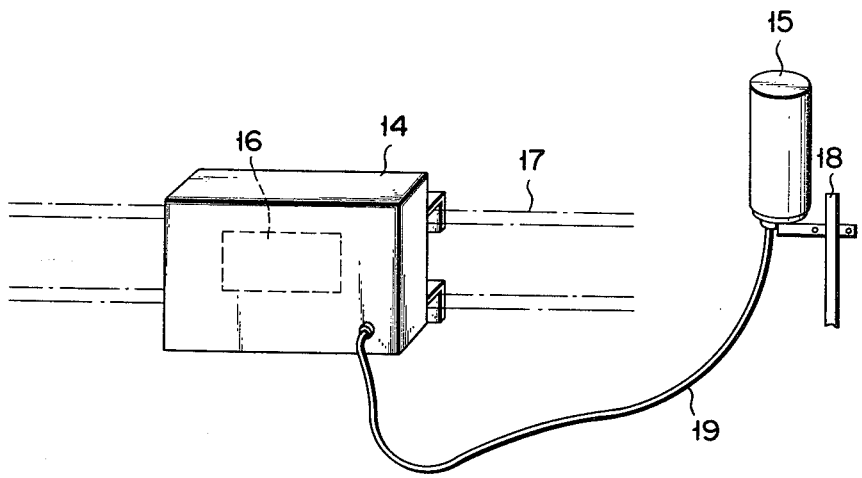
FIG. 5
a) INTERROGATION SIGNAL 
b) REPLY SIGNAL 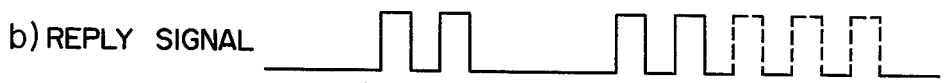

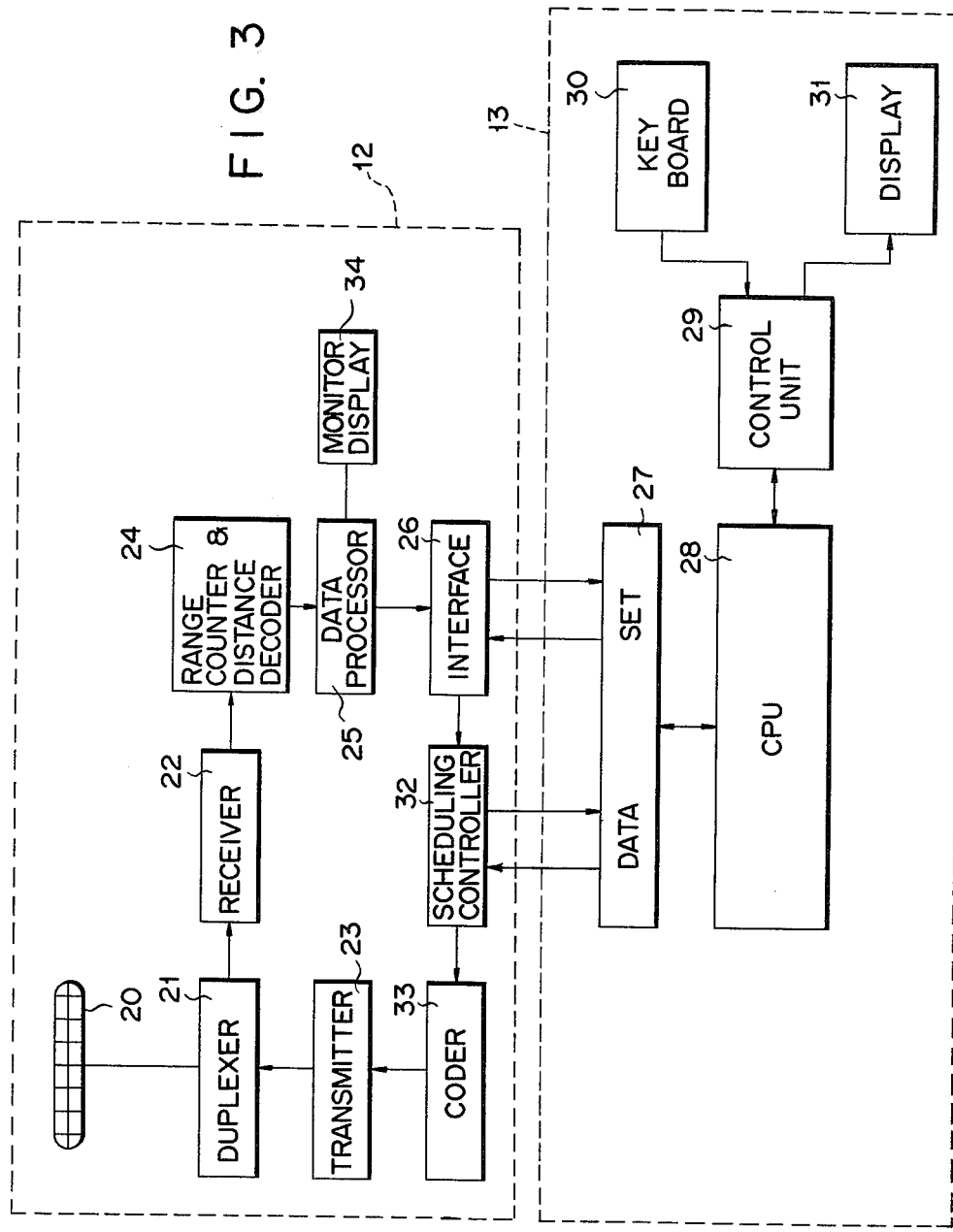

NAVIGATION-MONITORING APPARATUS

BACKGROUND OF THE INVENTION

This invention relates to a navigation-monitoring apparatus for detecting the position of a ship sailing through a narrow course, for example, a canal.

Where a ship sails through a narrow course such as a canal, an experienced pilot generally guides the ship, while visually confirming her route. When a clear view is obtained due to good weather conditions, the sailing of a ship through the canal under the guidance of a pilot raises no problem. However, when, for example, dense fog hangs over the course to obstruct the view, then a ship encounters considerable difficulties in clearing through the canal. In such case, the ship has to slow down her travelling speed for safety, or the canal itself must be closed to all shipping.

In recent years, shipping traffic has increased, and an increasing number of ships run through canals. Therefore, a strong need exists for a device which will ensure their safe and speedy passage through the canal in order to reduce the cost of navigation.

SUMMARY OF THE INVENTION

It is accordingly the object of this invention to provide a navigation monitoring apparatus for accurately detecting the position of a ship particularly when sailing through a narrow course, thereby ensuring safe and efficient navigation without being obstructed by weather conditions.

According to this invention, a fixed local station is provided on the ground. On the other hand, a ship is provided with a transponder. Thus, an interrogation signal issued from the local station is received by the ship's transponder which in turn transmits required data to the local station. At this time, a distance-measuring instrument carried on the ship determines the distance between the ship and nearest coast. Data on the measured distance is added to a reply signal returned from the ship. The ship's position is figured out from the interval between the point of time at which the local station sent forth the interrogation signal and the point of time at which the station received from the ship a reply signal denoting the arrival of the station's interrogation signal as well as from data on the above-mentioned distance between the ship and nearest coast which was delivered from the ship to the local station.

BRIEF DESCRIPTION OF THE DRAWING

FIG. 2 is a perspective view of the microwave sensor/transponder and transponder antenna used with the navigation-monitoring apparatus of FIG. 1;

FIG. 3 is a circuit block diagram of the local and central stations of FIG. 1;

FIG. 5 indicates the waveforms of interrogation and reply code signals.

DETAILED DESCRIPTION OF THE INVENTION

Figure 1:
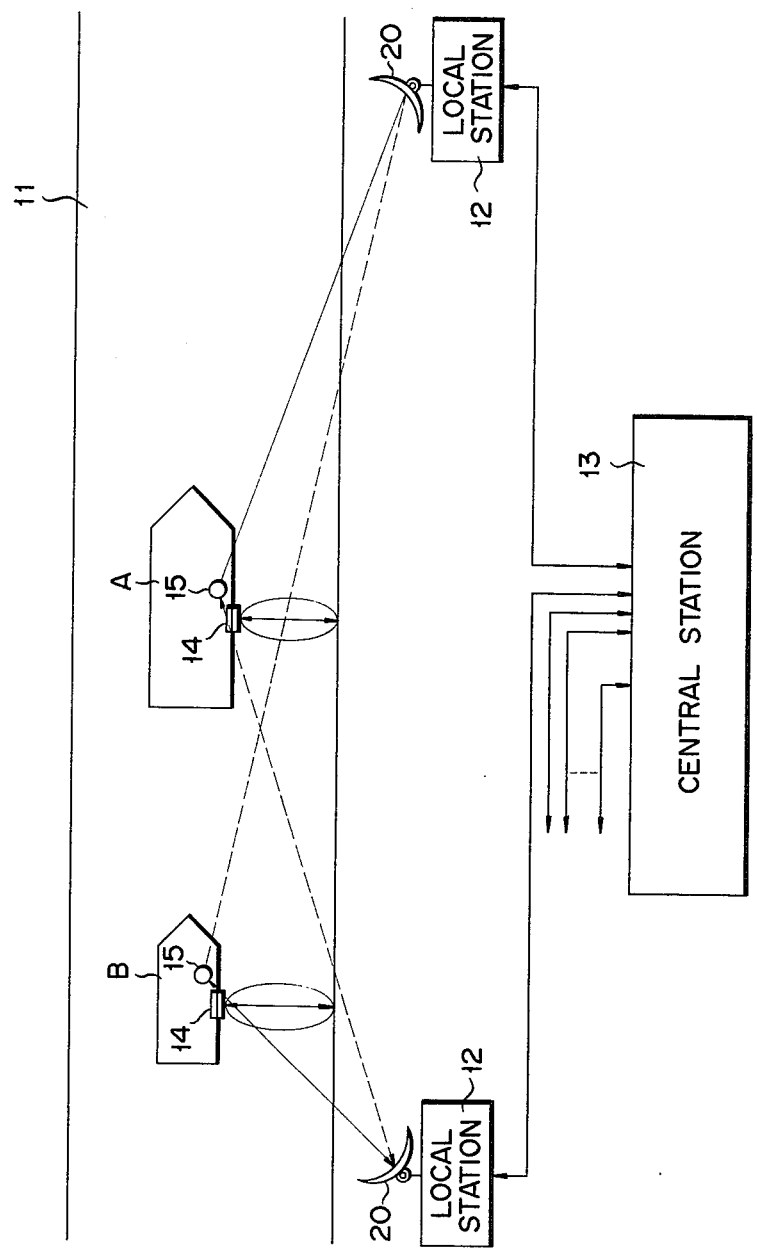
FIG. 1 illustrates the operation of a navigation-monitoring apparatus embodying this invention.

FIG. 1 shows a navigation monitoring apparatus for detecting the positions of a plurality of ships, for example, ships A and B passing through a narrow course, for example, a canal 11. With the subject navigation monitoring apparatus, a plurality of local stations 12 are arranged along the canal 11 at a distance of 10 Km, for example, from each other. The local stations 12 are electrically connected to a central station 13 to carry out transmission and reception of data therebetween. The ships A, B are equipped with a transmitting and receiving device comprising a microwave sensor/transponder 14 and transponder antenna 15. This transmitting and receiving device is attached to the hand rail 17 of a ship such that the built-in antenna 16 of the microwave sensor/transponder 14 is made to face the bank, as shown in FIG. 2. The transponder antenna 15 is fitted to a ship's pole 18. The microwave sensor/transponder 14 and transponder antenna 15 are connected by a cable 19.

In the local ground station 12, a scanning antenna 20 is connected, as shown in FIG. 3, to a receiver 22 and transmitter 23 through a duplexer 21. The receiver 22 is connected to a range counter & distance decoder 24 which determines the range between the respective local stations and the respective ships A, and B and encodes the results. The range counter & distance decoder 24 is connected to the data set 27 of the central station 13 through a data processor 25 and interface 26. The data set 27 is connected to a central processor unit or CPU 28, which is connected to a keyboard 30 and display 31 through a control unit 29. The data set 27 of the central station 13 is connected to a scheduling controller 32 through the interface 26. The central station 13 issues data on transmission timing and data on the sequential order of the address code corresponding to a ship whose position is to be detected. The scheduling controller 32 produces a signal denoting the data. The output terminal of the scheduling controller 32 is connected to a coder 33, which in turn is connected to a transmitter 23. This transmitter 23 is modulated by an output signal from a coder 33 to produce an interrogation signal. A data processor 25 is connected to a monitor display 34, which indicates the position of a ship from the data received.

Figure 4:
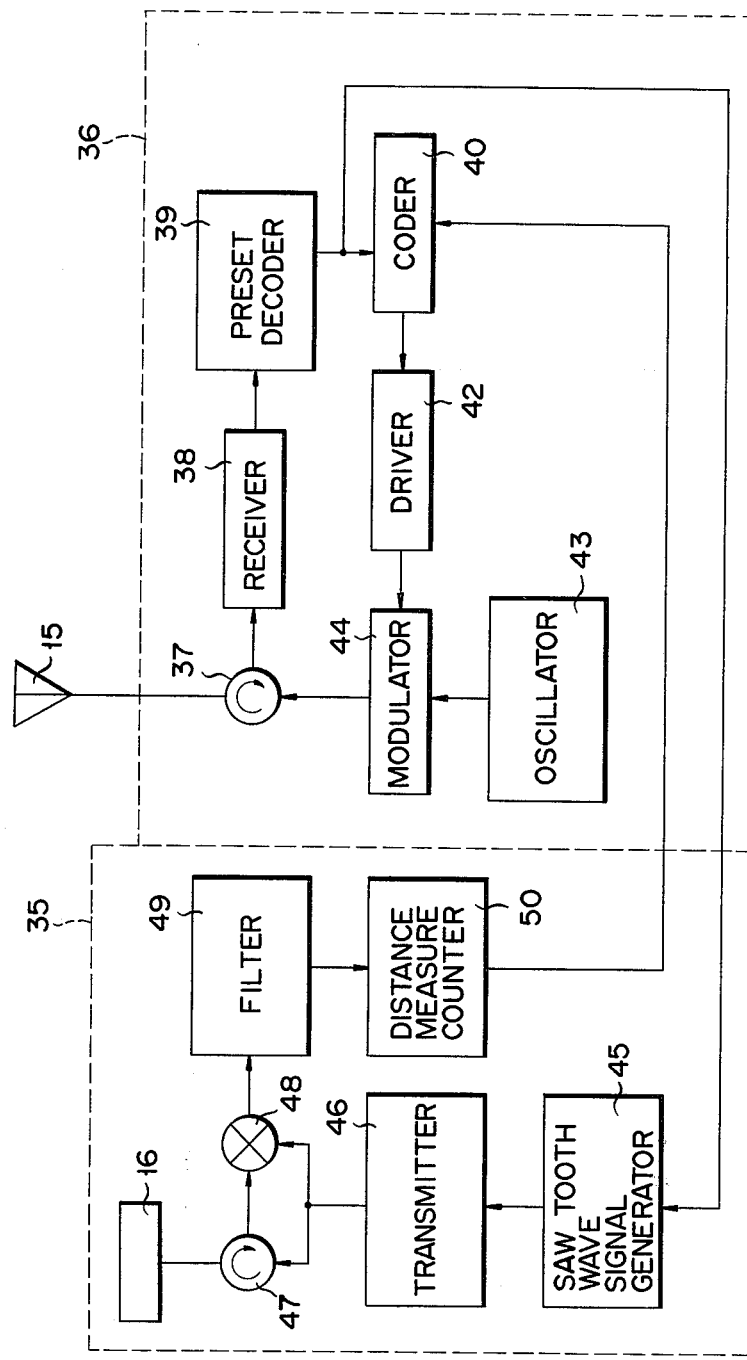
FIG. 4 is a circuit block diagram of the microwave sensor/transponder of FIG. 3.

The microwave sensor/transponder 14 carried on a ship comprises, as shown in FIG. 4, an assembly of a microwave sensor 35 and transponder 36. The antenna 15 of the transponder 36 is connected to a receiver 38 through a duplexer 37. The receiver 38 is connected to a preset decoder 39, which is previously supplied with an address code specified for a ship provided with the microwave sensor/transponder 14. The output terminal of the preset decoder 39 is connected to a coder 40. The coder 40 is connected to a driver 42. The output terminals of the driver 42 and an oscillator 43 are connected to a modulator 44. The output terminal of the preset decoder 39 is connected to a sawtooth wave signal generator 45 of the microwave sensor 35. The output terminal of the sawtooth wave signal generator 45 is connected to a transmitter 46. A transmission signal from the transmitter 46 is supplied to the built-in antenna 16 through a duplexer 47. The built-in antenna 16 is connected to a mixer 48 through the duplexer 47. The mixer 48 mixes a transmission signal from the transmitter 46 with a reception signal reflected from the bank. The output terminal of the mixer 48 is connected to a distance measure counter 50 through a filter 49. The output terminal of the distance measure counter 50 is connected to the coder 40.

There will now be described the operation of a navigation-monitoring apparatus embodying this invention. Referring to FIG. 3, the keyboard 30 of the central station 13 supplies various data, for example, a ship's name, dimensions (length, breadth and draft) of the ship, the address code of the transponder, port of her departure, location of convoy formation, ETA (Estimated Time of Arrival) and other necessary items. These data are previously stored in a memory (not shown). When the central station 13 makes a data request to the scheduling controller 32 of one of the local stations 12 through the interface 26, then transmission timing and the sequential order of the address code corresponding to a ship whose position is to be detected are preset in the scheduling controller 32. An output signal from the scheduling controller 32 puts the coder 33 into operation. The coder 33 sends forth, for example, an interrogation signal having a discrete address code shown in FIG. 5(a) which corresponds to the specified address code of the transponder 14. The discrete interrogation signal is supplied to the transmitter 23 (FIG. 3) to modulate an output signal therefrom. As a result, the transmitter 23 sends forth the interrogation signal shown in FIG. 5(a), which is supplied to the antenna 20 through the duplexer 21. When the transponder antenna 15 of the ship A (FIG. 1) receives the interrogation signal, the signal is conducted to the receiver 38 through the duplexer 37 (FIG. 4). The receiver 38 delivers the interrogation signal having the discrete address code (FIG. 5(a)) to the preset decoder 39, in which comparison is made between the received discrete address code and the address code preset therein. If coincidence arises between both address codes, then the preset decoder 39 sends forth an output signal to the coder 40 and the sawtooth wave signal generator 45 of the microwave sensor 35. The coder 40 is also supplied with an output signal from the microwave sensor 35. The sawtooth wave signal generator 45 of the microwave sensor 35 is triggered by an output signal from the preset decoder 39 of the transponder 36 thereby to generate a sawtooth wave signal. The sawtooth wave signal is supplied to the transmitter 46, which emits a frequency modulation-carrier wave (FM-CW) signal. The FM-CW signal is transmitted toward the bank of a canal through the duplexer 47 and built-in antenna 16. A signal reflected from the canal bank is supplied to the mixer 48 through the built-in antenna 16 and duplexer 47 in turn. The mixer 48, which is already supplied with the FM-CW signal from the transmitter 46, produces a beat signal corresponding to the interval between the point of time at which the transmission FM-CW signal was sent forth and the point of time at which a signal reflected from the canal bank was received. The output beat signal from the mixer 48 is filtered by filter 49. The frequency of the filtered beat signal is proportional to a distance between the ship A and the canal bank. When supplied with the beat signal, the distance measure counter 50 figures out the distance between the ship A and the canal bank. Distance data furnished by the distance measure counter 50 is conducted to the coder 40 of the transponder 36. Upon receipt of an output signal from the preset coder 39, the coder 40 produces a reply code, to which distance data supplied from the distance measure counter 50 is added, thereby putting the driver 42 (FIG. 4) into operation. An output signal from the driver 42 which corresponds to the reply code delivered from the coder 40, that is, the reply signal of FIG. 5(b) is conducted to the modulator 44 (FIG. 4). This reply signal modulates a signal issued from the oscillator 43. An output signal from the modulator 44 is sent back as a reply signal to a local station through the duplexer 37 and antenna 15.

After passing through the antenna 20 and duplexer 21 of the local station 12, the reply signal shown in FIG. 5(b) is delivered to the receiver 22. The reply signal of FIG. 5(b) received by the receiver 22 is conducted to the range counter & distance decoder 24, in which a count is made of an interval between the point of time at which the interrogation signal was sent and the point of time at which the reply signal was received. A range R from the local station 12 to the ship A is figured out from the counted value. Decoded range data is transmitted to the data processor 25, which compares new data with old data, stores new data, and transmits data to the central station 13, thereby actuating the monitor display 34. Data sent from the data processor 25 through the interface 26 to the central station 13 is delivered to the CPU 28 through the data set 27. The CPU 28 determines, from data furnished by the local stations, the sailing speeds of the respective ships, distances therebetween, and their future positions within a transit convoy. The CPU 28 also issues GO/NO-GO signals and alarm signals to, for example, the ship A in consideration of the interrelationship between the above-mentioned items of data and other data previously supplied from the keyboard with respect to the width and depth of a canal and the speed of current running therethrough, etc. Further, required data is indicated on the display 31.

At the request from the central station 13, the local stations 12 detect the positions of the ships A, B in a canal and send detected data to the central station 13. Generally, a convoy of about twenty ships passes through a canal during a prescribed period of time. Therefore, the respective local stations are required to detect the positions of about twenty ships. Assuming that the scanning antenna 20 of each local station is turned once every two or three seconds, data on the positions of the respective ships are similarly renewed every two or three seconds. If the length of time required to renew data is supposed to be three seconds, then data on the position of a ship sailing at a speed of eight knots, that is, about four meters per second, is changed, each time the ship travels twelve meters.

Where a ship-to-bank distance is measured by a microwave sensor carried on a ship, the reflection efficiency of FW-CW wave is sometimes decreased, depending on the contour of a bank. In such case, it is advised to provide the bank with a reflector constructed by assembling two metal plates at right angles or a spherical reflector. A ship-to-bank distance may be measured not only by FW-CW waves, but also any other distance-measuring device applying ultrasonic waves or light beams.

The foregoing embodiment refers to the case where the navigation-monitoring apparatus of this invention is applied to ships sailing through a canal. However, the invention is further applicable to the detection of the position of a ship sailing, for example, on a lake or through straits. In this case, the reflector is built on the ground of a shoal of a lake or straits. As used herein, the term "ground" is defined to include the surface of a sea or like apart from a canal.

According to the navigation-monitoring apparatus of this invention distance data determined by a ship-to-bank distance measuring device carried on a ship is added to a reply signal issued from the ship in response to an interrogation signal sent forth from a local station.

Thus the positions of ships sailing particularly through a narrow course such as a canal can be accurately defined by co-operation between the local and central stations, thereby ensuring their safe passage through the canal. The foregoing description refers to the case where the microwave sensor 35 commenced operation when an output signal from the preset decoder 39 of the transporder 36 acted as a trigger. Instead, it is possible to previously supply the coder 40 of the transporder 36 wih a fresh data on a ship-to-bank distance measured by the microwave sensor 35 and send forth a reply signal in response to an output signal from the preset decoder 39 by adding the previously supplied distance data.

We claim:

1. A navigation-monitoring system for detecting the position of ships relative to a nearest bank and a ground station which comprises:
    a transmitting and receiving device installed in a ground station to transmit an interrogation signal including a specified address code for each ship;
    a transmitting and receiving device carried on each ship to receive said interrogation signal and issue a reply signal; said ship transmitting and receiving device including means for detecting said specified address code, and a ship-to-bank distance measuring device for measuring ship-to-bank distance, after detecting said specified address code, and providing data indicative thereof; said ship-to-bank distance data being added to said reply signal in response to said interrogation signal;
    means installed in said ground station for calculating a ground station-to-ship distance from a time interval between the time at which said interrogation signal is issued and the time at which said reply signal from the ship is received; and
    means installed in said ground station for obtaining said ship-to-bank distance data from said reply signal.

2. The system according to claim 1, wherein said ground transmitting and receiving device includes a scanning antenna for periodically transmitting said interrogation signal to the respective ships sailing through a specified course, and receiving said reply signal sent back from the respective ships.

3. The system according to claim 1, wherein said ship-to-bank distance measuring device comprises means for issuing FM-CW waves to a nearest bank; antenna and duplexer means for receiving waves reflected from said nearest bank; a mixer for mixing said issued FM-CW waves with said reflected waves to produce beat signals; and means for measuring a ship-to-bank distance from the frequency of said beat signals issued from said mixer.

4. A navigation-monitoring system comprising:
    at least one fixed ground station for issuing an interrogation signal to a ship passing through a prescribed course; and a transmitting and receiving device carried on said ship to send forth a reply signal in response to said interrogation signal issued from said fixed ground station;
    wherein said fixed ground station includes signal-transmitting means for sending forth an interrogation signal including an address code specified for each ship; and signal-receiving means for receiving a reply signal issued from said ship;
    wherein said transmitting and receiving device carried on said ship includes means for receiving said interrogation signal from said fixed ground station; a preset decoder having stored therein an address code specified for said ship for comparing an address code included in said interrogation signal received by said signal-receiving means with said stored address code, and in case of coincidence between said address codes, producing a coincidence output signal; means for measuring a distance between said ship and a predetermined point in response to said coincidence signal and issuing a data signal denoting said ship-to-point distance; and means for transmitting said reply signal including said ship-to-point distance data signal to said fixed ground station;
    and wherein said fixed ground station comprises means for measuring a time interval between the time at which an interrogation signal was issued and the time at which a reply signal from the ship was received, and defining the position of said ship relative to said fixed ground station from said time interval and said ship-to-point distance data.

5. The system according to claim 4, wherein the means for issuing a data signal denoting said ship-to-point distance comprises means for irradiating FM-CW waves toward said point; antenna and duplexer means for receiving waves reflected from said point; means for mixing said FM-CW waves with said reflected waves to produce beat signals; and means for calculating said ship-to-point distance from the frequency of said beat signals.

* * * * *